United States Patent [19]

Urakami

[11] Patent Number: 4,904,381
[45] Date of Patent: Feb. 27, 1990

[54] MAGNETIZATION TREATMENT APPARATUS OF FLUID

[76] Inventor: Kazuko Urakami, 6-18, Hibarigaoka 1-chome, Takarazuka-shi, Hyogo 665, Japan

[21] Appl. No.: 238,212
[22] PCT Filed: Jul. 16, 1987
[86] PCT No.: PCT/JP87/00523
 § 371 Date: Jun. 22, 1988
 § 102(e) Date: Jun. 22, 1988
[87] PCT Pub. No.: WO88/03513
 PCT Pub. Date: May 19, 1988

[30] Foreign Application Priority Data

Nov. 10, 1986 [JP] Japan .................. 61-172358
Dec. 5, 1986 [JP] Japan .................. 61-188034
Mar. 27, 1987 [JP] Japan .................. 62-46505
Apr. 9, 1987 [JP] Japan .................. 62-53817

[51] Int. Cl.⁴ .......................... B01D 35/06
[52] U.S. Cl. ..................... 210/223; 210/222; 210/244; 261/DIG. 75
[58] Field of Search ........... 210/695, 222, 223, 244, 210/245; 55/2, 3, 100; 123/536, 537, 538, 539; 261/DIG. 75, DIG. 80

[56] References Cited

U.S. PATENT DOCUMENTS 4,645,603 2/1987 Frankl .................. 210/695

FOREIGN PATENT DOCUMENTS

83444 7/1983 European Pat. Off. .
912665 3/1982 U.S.S.R. .................. 210/223
1130537 12/1984 U.S.S.R. .................. 210/223
1150229 4/1985 U.S.S.R. .................. 210/223
2047104A 11/1980 United Kingdom .................. 210/223

Primary Examiner—W. Gary Jones
Assistant Examiner—Matthew O. Savage
Attorney, Agent, or Firm—Jordan and Hamburg

[57] ABSTRACT

Apparatus for magnetization treatment of fluid used to activate such fluids as water and oil by treating in a magnetic field to improve the quality thereof includes a rotor having a magnetic field generator is arranged in a passage or a reservoir of fluid and is rotatable by being connected with a rotating means. The rotating magnetic field is produced in the fluid passage or reservoir, thereby the fluid is strongly magnetized and effectively activated, showing a very efficacious improvement of the fluid quality.

19 Claims, 10 Drawing Sheets

MAGNETIZATION TREATMENT APPARATUS OF FLUID

FIELD OF THE INVENTION

The present invention relates to an apparatus for magnetization treatment of a fluid, which is used to treat such fluid as water or oil in a magnetic field to activate it and to improve its quality.

BACKGROUND OF THE INVENTION

In recent years, equipment intended for improving, for example, the quality of water by applying a magnetic field caused by a permanent magnet to the water has been proposed. Such type of equipment comprises a plurality of annular permanent magnetic plates arranged on a water passage of the tap water pipe so as to activate the water by applying the magnetic field caused by the permanent magnetic plates.

In the case of such construction, however, since the magnetic field formed in the water passage is a static magnetic field with a low intensity of magnetization, the water is not effectively activated and the effect of improvement of the water quality is not fully satisfied.

Also, recently, for improving the quality of drinking water, a magnetization treatment bottle comprising a plurality of permanent magnets suitably arranged on the peripheral walls of a container has been proposed. The bottle is designed to activate the drink water in the container by applying the magnetic field caused by the permanent magnet thereto.

In the case of a magnetization treatment bottle having such construction, however, since the magnetic field formed in the container is also a static magnetic field with a low intensity of magnetization, the water is not effectively activated and improvement of the water quality is not sufficient.

The present invention is devised by observing the above-noted problems, therefore, it is an object thereof to provide a novel apparatus for magnetization treatment of fluid, which is capable of effectively activating such fluid as water by rotating the magnetic field formed in a passage or a reservoir of the fluid.

DISCLOSURE OF THE INVENTION

An apparatus for magnetization treatment of fluid according to the present invention is provided with a rotor having a magnetic field generator rotatably in a passage or a reservoir of the fluid, and a rotating means coupled to the rotor.

According to the present invention, when the rotor is driven by the rotating means, the magnetic field generator is rotated integrally to generate a rotating magnetic field in its surroundings. Thus, when the fluid passes through or accumulates in the magnetic field, which is strongly magnetized and activated effectively, a remarkable result of improving the fluid quality is obtained.

BEST MODE FOR EMBODYING THE INVENTION

Figure 1:
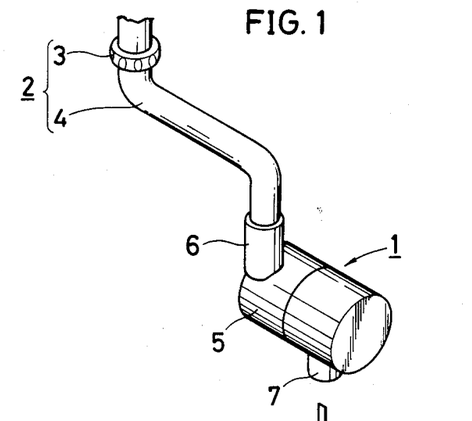
FIG. 1 is a perspective view showing a using condition of an apparatus for magnetization treatment of fluid in accordance with one embodiment of the present invention.

FIG. 1 through FIG. 9 show an apparatus for magnetization treatment 1 for magnetizing flowing fluid, wherein FIG. 1 shows the apparatus 1 of one embodiment mounted on a faucet 2.

The faucet 2 comprises a faucet pipe 4 connected to the tip of a faucet body (not shown) by means of a fixing metal 3, and provided with the apparatus 1 at the tip thereof.

Figure 2:
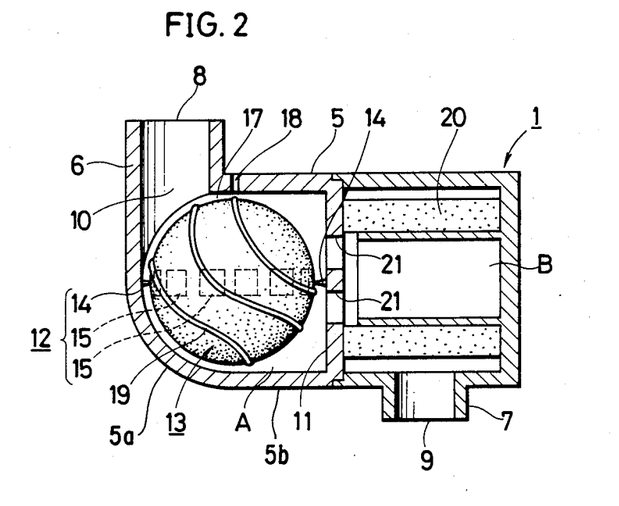
FIG. 2 is a longitudinal sectional view of the first embodiment of the present invention.

In the apparatus 1, as shown in FIG. 2, an inflow pipe 6 for admitting tap water and an outflow pipe 7 for discharging the treated water are projected in the opposite direction integrally respectively at one end and at the other end of a hollow case 5 made of a synthetic resin, whose hollow section is provided with a water passage 10 communicating an inlet 8 of the inflow pipe 6 and an outlet 9 of the outflow pipe 7. The hollow case 5 has a partial spherical connection 5a (FIG. 2) which connects the inflow pipe 6 and the lower housing portion 5b. A partition 11 is arranged substantially in the middle of the water passage 10, and in a chamber A on the upstream side relative to the partition 11, a rotor 13 including a magnetic field generator 12 is disposed. The rotor 13 is a hollow sphere and rotatably supported with two diametrically opposed shaft portions or supporting axes 14, 14 which are rotatably supported in bearing support means at both sides.

Figure 3:
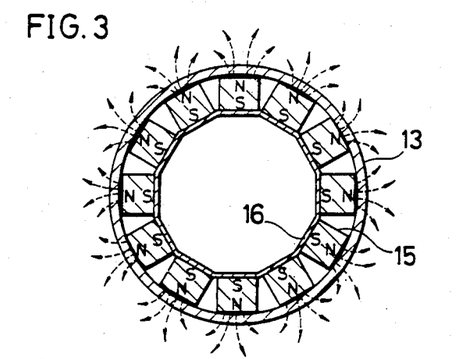
FIG. 3 is a sectional view of a rotor.

The magnetic field generator 12 is for producing a d.c.rotating magnetic field in the surrounding water passage, and that of the present embodiment is, as shown in FIG. 3, formed by registering and fixing a plurality of permanent magnets 15 in the hollow section of the rotor 13 with N-poles facing outwardly, and arranging magnetic plates 16 such as iron sheets on S-poles of the magnet train in series. Thus, lines of magnetic force (shown at broken lines in FIG. 3) departing from each permanent magnet 15 act outwardly from the spherical surface of the rotor 13 as the d.c.magnetic field.

In the embodiment, the diameter of the rotor 13 is set slightly smaller than that of the case 5 to form a narrow gap 17 therebetween, and through the case 5 corresponding to the narrow gap 17, one or a plurality of air suction holes 18 are formed.

The narrow gap 17 serves to increase the flow rate of the water to cause a suction force in the air suction holes 18, thereby sucking air into the water flow to produce bubbles.

On the surface of the rotor 13, moving vanes 19 for converting the water energy flowing inside the passage 10 into a driving force are formed integrally. Thus when the water flow works on the rotor 19 and the driving force is produced, the rotor 13 as well as the d.c.magnetic field in the surroundings are thereby rotated.

In a chamber B on the downstream side relative to the partition 11, there is arranged a filter member 20, whose inner region is in communication with the chamber A via a communicating hole 21 opened in the center portion of the partition 11. Though the filter member 20 is designed to remove impurities in the water and is formed of a ceramic filter or the like, in the filter member 20, for example, in the case of domestic use, compositions effective for the human body, e.g. mineral compositions such as Ca, Mg and the like, may be contained, and for agricultural use, effective compositions for agricultural products may be added respectively.

The water thus admitted into the chamber B through the communicating hole 21 is passed through the filter member 20 to its outer region and guided further to the outlet 9.

Figure 4:
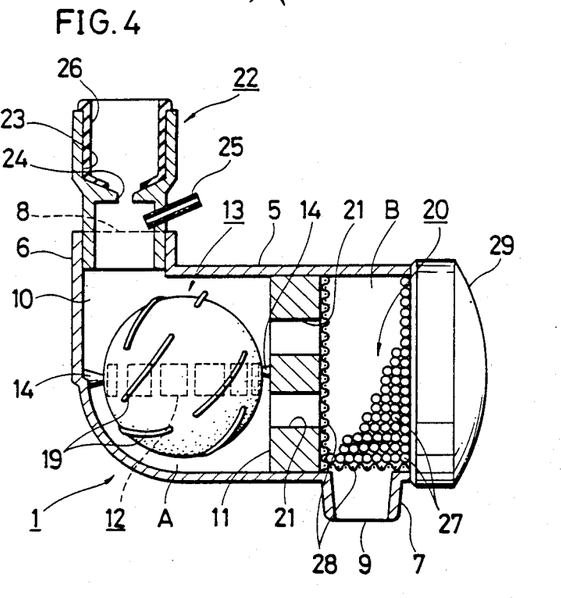
FIG. 4 is a longitudinal sectional view of the second embodiment of the present invention.

FIG. 4 shows another embodiment (second embodiment) of the present invention.

In the drawing, the hollow case 5 is formed of a transparent synthetic resin, through which the rotor 13 and the filter member 20 can be seen.

In the hollow case 5, the inflow pipe 6 having the inlet 8, the outflow pipe 7 having the outlet 9 and the water passage 10 communicating the inlet 8 and outlet 9 are formed, and to the inflow pipe 6, a connecting pipe 22 for connecting the apparatus 1 to the faucet pipe is connected. Inside the connecting pipe 22, a large diameter portion 23 having a larger inside diameter and a reduced diameter portion 24 having a smaller diameter are disposed respectively on the inflow side and at the intermediate portion, and on the outflow side of the reduced diameter portion 24, one end of an air suction pipe 25 is located. The reduced diameter portion 24 serves to increase the water flow rate to produce a suction force with respect to the air suction pipe 25, through which air is sucked into the water flow and bubbles are produced. A rubber packing 26 is inserted into the larger diameter portion 23.

In the hollow case 5, the partition 11 is provided generally at the intermediate position, and in the chamber A on the upstream side relative to the partition 11, the supporting axes 14, 14 are projected in opposition and hold the rotor 13 including the magnetic field generator 2 and the moving vanes 19 rotatably therebetween. The rotor 13, the moving vanes 19 and the magnetic field generator 12 are constructed as same as the first embodiment, so here its explanation will be omitted.

In the chamber B on the downstream side relative to the partition 11, the filter member 20 is disposed, and the chamber B and the chamber A are in communication via the communicating hole 21 opened through the center portion of the partition 11.

The filter member 20 serves to perform a prescribed treatment corresponding to its quality besides filtering the water flowing through the water passage 10, and constructed by collecting a large number of small balls 27 (about a few mm diameter). In the embodiment, each small ball 27 is formed of a permanent magnet and gold or silver plated. Each small ball 27 produces a static magnetic field against the water and narrow gaps between each ball serve to remove impurities contained in the water.

Though the small balls 27 of the embodiment are formed of a permanent magnet, it is not limited thereto, and it may be of ceramics containing for example, mineral compositions such as Ca, Mg and the like which is efficacious for the human body in the case of drinking water, and compositions effective for agricultural products in the case of agricultural use. Moreover, the filter member 20 may be constructed by mixing the small balls of ceramic containing the aforementioned compositions with small balls of permanent magnets.

Around the chamber B, a net 28 is arranged to prevent the small balls 27 from coming out of the chamber, and a cover 29 for taking the filter member 20 in and out from the chamber B is provided on one side thereof.

Figure 5:
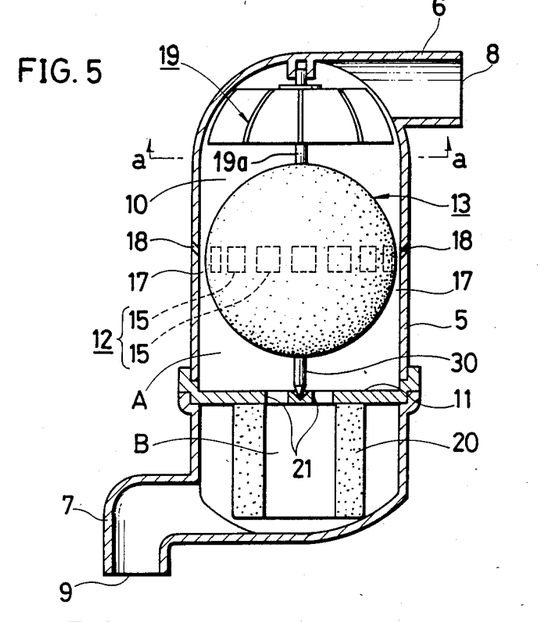
FIG. 5 is a longitudinal sectional view of the third embodiment of the present invention.
Figure 6:
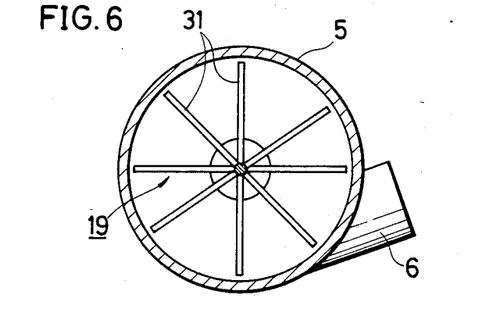
FIG. 6 is a sectional view taken along the line a—a of FIG. 7 is a longitudinal sectional view of the fourth embodiment of the present invention.

FIG. 5 and FIG. 6 show the third embodiment of the present invention.

In the third embodiment, contrary to the first and second embodiments where the moving vanes 19 and the rotor 13 are formed integrally, the moving vanes 19 is formed and arranged independently from the rotor 13. The vanes 19 are connected to the rotor 13 by connecting means 19a shown in FIG. 5.

In the embodiment shown in the hollow section of the case 5 formed integrally with upper inflow pipe 6 and the lower outflow pipe 7, the water passage 10 communicating the inlet 8 and the outlet 9 is formed downwardly, the partition 11 having the communicating hole 21 is located in the middle of the water passage 10, in the chamber A on the upstream side and the chamber B on the downstream side, the rotor 13 including the magnetic field generator 12 and the moving vanes 19, and the filter member 20 are disposed respectively.

The rotor 13 and the moving vanes 19 are disposed independently on a rotary axis 30 supported rotatably at upper and lower ends. The moving vanes 19 is formed with a plurality of radially arranged vanes 31 and positioned in such a manner that the surface of the vane 31 is opposed to the inlet 8.

The magnetic field generator 12 comprises a plurality of permanent magnets 15 arranged in the hollow section of the rotor 13, and similarly to the first embodiment, the narrow gap 17 is formed between the rotor 13 and the case 5 with the air suction hole 18 opened therethrough.

Figure 7:
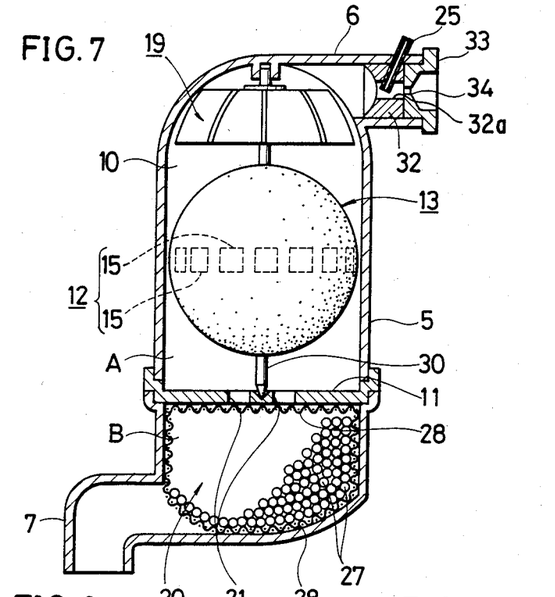

FIG. 7 shows the fourth embodiment of the present invention.

In the embodiment shown, the hollow case 5 is formed of a transparent synthetic resin, through which the rotor 13. the moving vanes 19 and the filter member 20 can be seen.

The hollow case 5 includes the inflow pipe 6 and the outflow pipe 7 in one body and formed with the water passage 10 therethrough. In the inflow pipe 6, an insertion pipe 32 and a rubber connecting pipe 33 for connecting to the faucet pipe are disposed. Inside the connecting pipe 33, there is provided a reduced diameter portion 34, on the outflow side of which or inside the insertion pipe 32, one end of the air suction pipe 25 is positioned. The air suction pipe 25 is provided through the inflow pipe 6 and the insertion pipe 32, and as a result of the water flow rate increased by the reduced diameter portion 34, a suction force is produced in the air suction pipe 25 and the air is sucked into the water flow, producing bubbles. The reduced diameter portion 34 constitutes a first fluid passage section and the internal passage 32a in the insertion pipe 32 constitutes a second fluid passage section.

In the hollow case 5, the partition 11 having the communicating hole 21 is provided, and in the chamber A on the upstream side and in the chamber B on the downstream side relative to the partition 11, the rotor 13 having the magnetic field generator 12 and the moving vanes 19, and the filter member 20 are disposed respectively. These magnetic field generator 12, rotor 13 and moving vanes 19 are constructed as same as those of the third embodiment, and the filter member 20 is similar to that of the second embodiment so their explanation will be omitted and corresponding parts are indicated by the same reference characters.

Though each embodiment aforementioned is used for improving the quality of water, the apparatus for magnetization treatment of fluid in accordance with the present invention is not limited thereto, but may be used for improving the quality of oil and other fluids.

Also, in each of the aforementioned embodiments, though the rotor 13 is driven by rotating the moving vanes 19 by the energy of the flowing water, for example, when the fluid to be treated has a high viscosity, the rotor 13 may be connected to a driving source such as a motor to produce the driving force.

Further, though all the rotors 13 in the aforementioned embodiments comprise the hollow spheres, it is not limited thereto, other designs and modifications may be made freely.

Figures 8, 9:
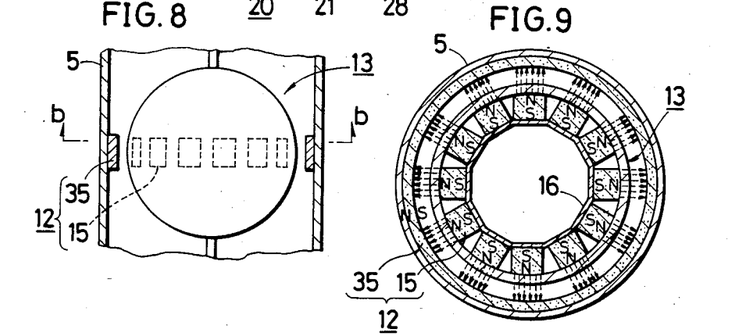
FIG. 8 is a partially sectional view showing another construction of a magnetic field generator.
FIG. 9 is a sectional view taken along the line b—b of FIG. 8.

Furthermore, though the magnetic field generator 12 in the embodiments mentioned above comprises a plurality of permanent magnets 15 arranged in alignment in the rotor 13, they may be arranged outside the rotor 13 or the method of alignment or the direction of magnetic poles may be set freely. Also, as shown in FIG. 8 and FIG. 9, in addition to the permanent magnets 15 arranged on the rotor 13 as same as the aforementioned embodiments, annular permanent magnets 35 with inner S-poles and outer N-poles may be disposed on the inner surface of the case 5 to form the magnetic field generator 12, in such case, a radial magnetic field (shown by broken lines in the drawing) may be produced between the inner and outer permanent magnets 15, 35.

Figure 10:
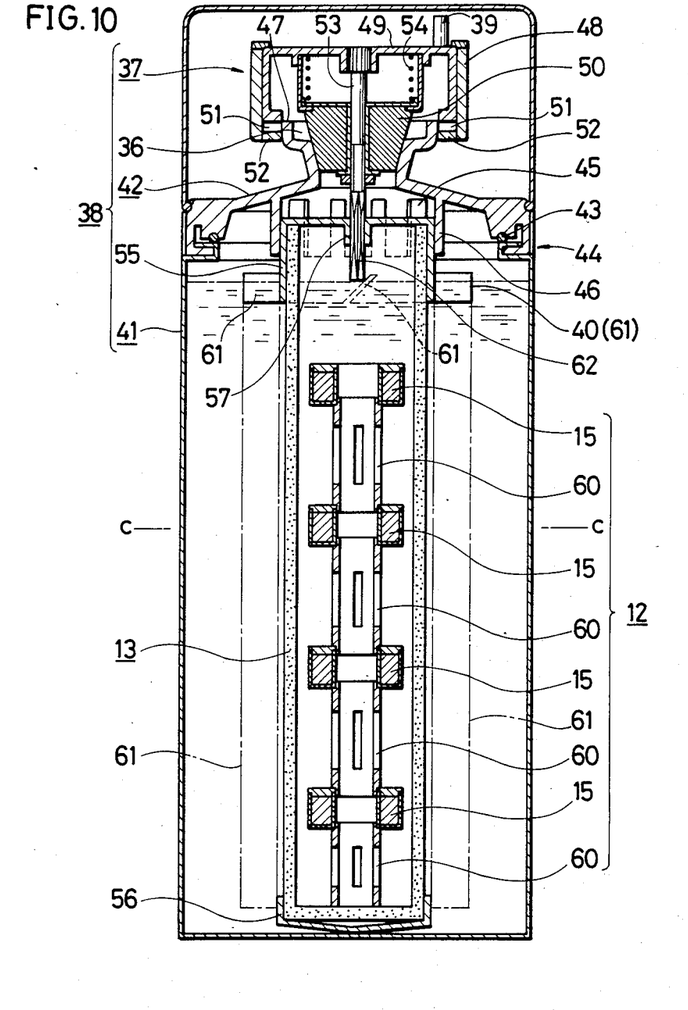
FIG. 10 is a longitudinal sectional view of the fifth embodiment of the present invention.
Figure 11:
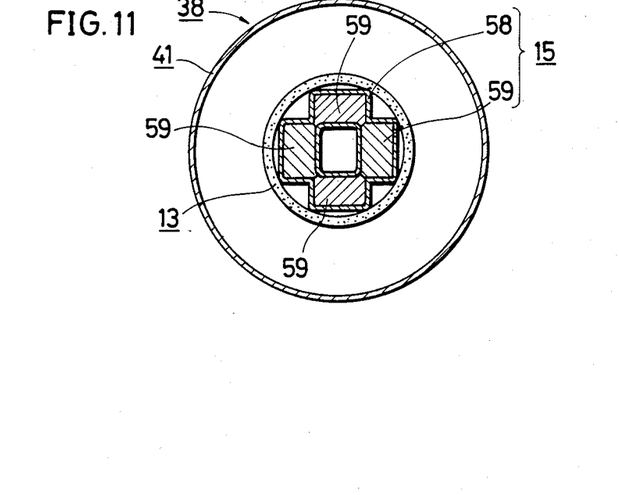
FIG. 11 is a sectional view taken along the line c—c of FIG. 10.
Figure 12:
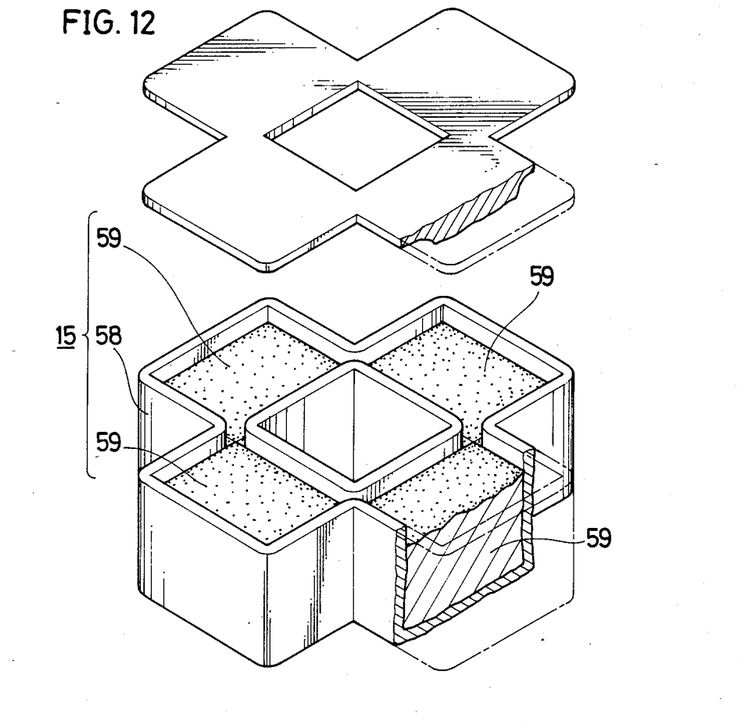
FIG. 12 is a perspective view of a permanent magnet disposed in a cylinder.

FIG. 10 through FIG. 18 show the apparatus for magnetization treatment of fluid for magnetizing the fluid in a reservoir, wherein FIGS. 10 to 12 show one example (fifth embodiment) and FIGS. 13 to 18 show another example (sixth embodiment) in which the apparatus 1 is constructed as a magnetization treatment bottle.

In the fifth embodiment of FIGS. 10 to 12, the bottle comprises a container 38 (FIG. 10) provided with a closure 37 at a pouring mouth 36, a cylindrical rotor 13 rotatably disposed vertically in the center of the container 38 and an operating handle 39 linked to the rotor 13 for rotating the same axially. In the rotor 13, a magnetic field generator 12 comprising a plurality of permanent magnets 15 is arranged and on the wall thereof, a stirring means 40 is provided.

The container 38 in FIG. 10 is so constructed that, a cover 42 having the pouring mouth 36 is installed on the upper end of a cylindrical body 41 with a top opening and having a suitable depth by a detaching mechanism 44 including a seal member 43, and the closure 37 is mounted on the pouring mouth 36.

The cover 42 in FIG. 10 is formed of a synthetic resin having a good lubricating property and provided with a supporting wall 46 having slits 45 opened in equally spaced relation circumferentially, supporting the rotor 13 rotatably between the supporting wall 46 and the bottom of the body 41.

In the closure 37, a cylinder plate 49 is held inside a supporting cylinder 48 engaging and disengaging an upper peripheral flange 47 of the pouring mouth 36, and a plug body 50 made of silicon rubber is installed on the lower surface of the cylinder plate 49.

On the flange 47 of the pouring mouth 36, concave notches 51 are provided at suitable locations, and at the lower portion of the supporting cylinder 48, projections 52 engaging with the notches 51 are projected inwardly. After engaging the projections 52 to the notches 51 to position beneath the flange 47, the supporting cylinder 48 may be mounted on the flange 47 by rotating the same. By operating reversely, the supporting cylinder 48 may be removed from the flange 47.

Within the supporting cylinder 48, the cylinder plate 49 is rotated and from its subsurface center, a supporting shaft 53 is suspended, on which the plug body 50 is mounted movably vertically and energized elastically at the descending end by a spring 54. Thus, when the supporting cylinder 48 is engaged to the flange 47, the plug 50 is elastically engaged in the pouring mouth 36 to plug it tightly, and when the supporting cylinder 48 is disengaged from the flange 47, it rises from the pouring mouth 36 to open it.

The rotor 13 is formed by pressing a "bakuhanseki" powder with compounding ingredients such as a binder and a synthetic resin at a prescribed temperature, and its entire wall is porous and water penetrative, adsorbing and filtering the impurities in the water. "Bakuhanseki" has the following contents: 69.72% $SiO_2$, 14.01% $Al_2O$, 1.29% $Fe_2O_3$, 1.4% FeO, 3.55% MgO, 2% CaO, 3.16% $Na_2O$, 3.19% $K_2O$, 0.3% $TiO_2$, 0.26% $P_2O_5$, 0.02% MnO, 0.9% $H_2O(+)$, and 1.1% $H_2O(-)$. To the upper and lower portions of the rotor 13, caps 55, 56 formed respectively of a synthetic resin material having a good lubricating property are engaged in such a manner that the upper cap 55 is supported with the supporting wall 46 of the cover plate 42, and the lower cap 56 is supported on the bottom of the body 41 in a point contact so as to be rotatable. In the upper cap 55, a square hole 57 is formed in the center and slits (not shown) are provided around the square hole 57.

Each permanent magnet 15 arranged in the rotor 13 comprises, as shown in FIG. 11 and FIG. 12, two pairs of permanent magnet tongues 59 respectively opposing lengthwise and breadthwise enclosed with respect to a suitably shaped synthetic resin housing 58 which is in conformity with the cylinder opening, and the upper and lower permanent magnets 15 are supported in a suitably spaced relation in the housing 58 via cylindrical retainers 60 interposed therebetween.

The stirring means 40 is provided with a plurality of vanes 61, at least, at the upper position outside the rotor 13, each vane 61 forming a spiral angle relative to the rotating center of the rotor 13. Thus, by the rotation of the rotor 13, fluid such as air, water etc. is adapted to be stirred as moving downwardly in the container 38.

As a driving means for the rotor 13, a square portion 62 is provided at the lower end of the supporting shaft 53 supporting the plug 50 and engaged with the square hole 57 formed in the cap 55 of the rotor 13 for connection, and a crank means or operating handle 39 is disposed at a desired location on the cylinder cover 49.

Thus, when the operating handle 39 is operated, the rotor 13 is rotated axially via the cylinder plate 49 and the supporting shaft 53.

FIGS. 13 to 18 show the previously mentioned sixth embodiment. In this sixth embodiment, a cover plate 42 (FIGS. 13, 14, 17 and 18) is formed of a synthetic resin having a good lubricating property similar to the previous embodiment, and on its inner surface, the supporting wall 46 of the rotor 13 is formed integrally.

Figure 17:
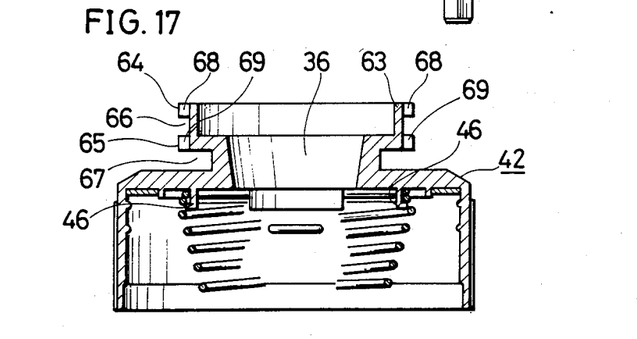
FIG. 17 is a longitudinal sectional view of the cover.
Figure 18:
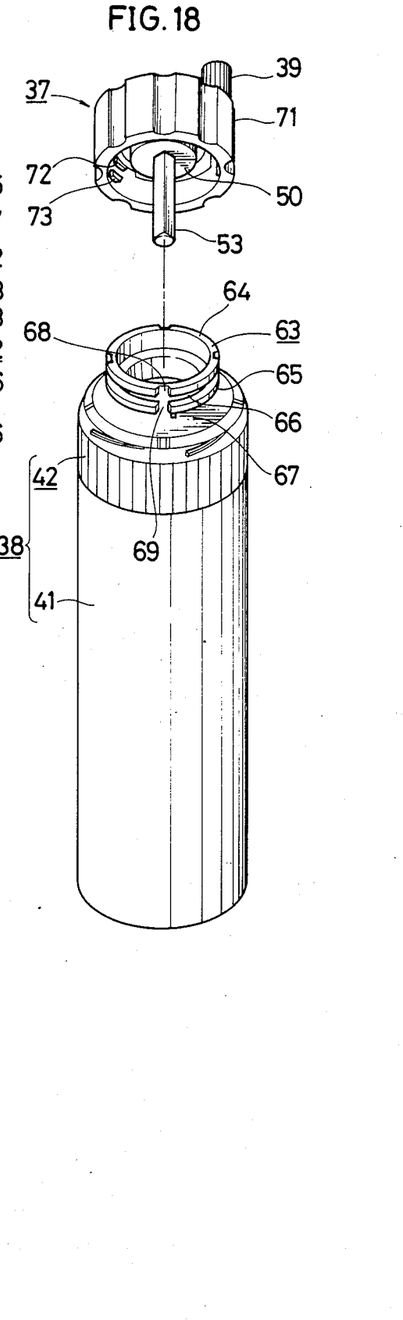
FIG. 18 is a perspective view showing a detaching state of the plug.

As shown in FIG. 17 and FIG. 18, flanges 64, 65 are disposed on the upper and lower portions of a cylinder portion 63 surrounding the pouring mouth 36 to form two engaging grooves 66, 67, and notches 68, 69 are formed on the two flanges 64, 65 at symmetrical positions lengthwise and breadthwise, the lower engaging groove 67 being used for securing the plug at tight plugging and the upper engaging groove 66 for rotatively guiding the cover 37. The cylinder portion 63 defines a top opening or pouring mouth 36. The flanges 64, 65 and engaging grooves 68, 67 define support means for rotatably supporting rotary means which includes the cap 37 and the rotor 13.

The cover 37 is, as shown in FIG. 13 through FIG. 16, formed by moulding a synthetic resin in a cup-shape with a lower opening to conform with the cylinder portion 63 of the cover plate, and the upper end of the supporting axis 53 is mounted on the lower surface of a top plate 70 by means of insertion molding to engage the rubber plug 50, which is adhered and fixed to the lower surface of the top plate 70.

Figure 13:
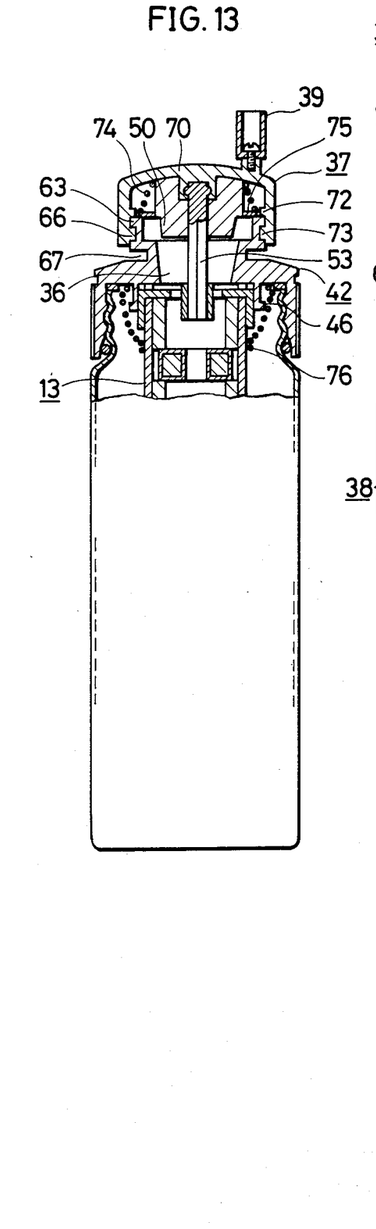
FIG. 13 is a sectional view showing another embodiment of a cover and a plug.
Figure 14:
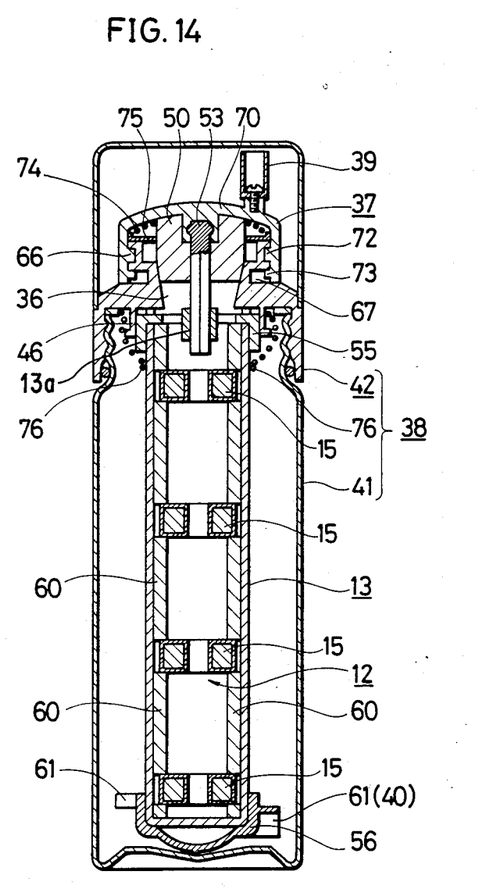
FIG. 14 is a longitudinal sectional view showing a closed state of FIG. 13.
Figure 15:
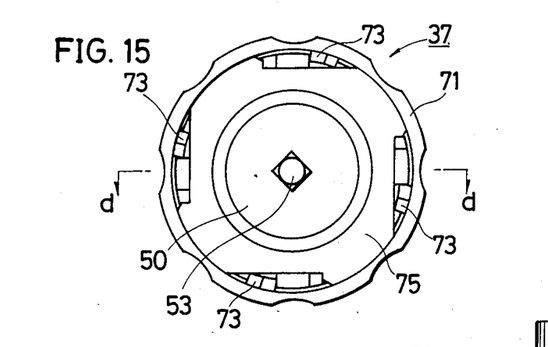
FIG. 15 is a view showing the lower surface of the plug.
Figure 16:
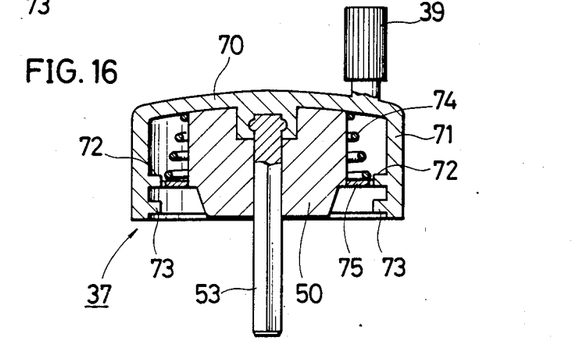
FIG. 16 is a sectional view taken along the line d—d of FIG. 15.

On the inner surface of the cylinder portion 71 of the cover 37, projections 72, 73 fitting to the space between the upper and lower engaging grooves 66, 67 of the cylinder portion 63 of the cover plate and conforming with the notches 68, 69 are projected at symmetrical positions lengthwise and breadthwise, and between the plug body 50 and the cylinder portion 71, a plate 75 supported by a spring 74 is arranged movably upward and downward. The plate 75 has its descending end at the lower side of the upper projection 72, and supported by the upper projection 72, and supported by the upper end surface of the cylinder portion 63 when the lower projection, 73 is engaged to the engaging groove 66 from the notch 68, enabling the plug 37 including the supporting shaft 53 to rotate by the handle 39. Also, when the plate 75 is pressed against the spring force and the two projections 72, 73 are engaged respectively to the engaging grooves 66, 67 from the notches 68, 69, the cover 37 is engaged to the pouring mouth 36 to plug it tightly.

In this embodiment, a spring 76 is provided between the rotor 13 and the cover plate 42 to improve the stable axial rotation of the rotor 13. The rotor 13 has a shaft receiving aperture 13a (FIG. 14) which receives the shaft 53. The shaft 53 is axially slidable in the aperture 13a so that the shaft 53 can be slid out of the aperture 13a and the cover removed as shown in FIG. 18.

In operation, the cover 37 is made movable vertically relative to the pouring mouth 36 and a shaft 53 is suspended for connection with the rotor 13, which is also moved axially by the vertical movement of the cover 37. In place of such manual operation, a miniature motor may be incorporated on the bottom of the container 38 to drive the rotor 13 electrically.

INDUSTRIAL APPLICATION

The operation of the first embodiment will be explained.

When tap water is fed into the water passage 10 from the inlet 8, the water strikes the moving vanes 19 and imparts a rotating force to the rotor 13, thereby the magnetic field generator 12 is rotated to produce a d.c. rotating magnetic field in the surrounding water passage. Thus, when the water passes through the rotating magnetic field, molecules of water will receive the electrical energy based upon the following equation and are activated.

$$E = Blv \ldots 1$$

where
 E = Inductive voltage,
 B = Magnetic flux density,
 l = Length of conductor crossing the magnetic field,
 v = Velocity of conductor relative to the magnetic field, Also, when the water passes through the narrow gap 17, air is sucked through the air suction hole 18 by an ejector action so that innumerable bubbles are produced in the water, thereby oxygen is replenished into the water and the concentration of oxygen ions is raised by the magnetic field.

Moreover, the bubbles condense impurities contained in the water and adsorb onto the surfaces, which are removed while passing through the filter member 20. When constant magnetic substances such as iron and nickel are contained in the water as the impurities, such impurities are adsorbed onto the surface of the rotor 13 by the suction force of the permanent magnet 15. Also, when such diamagnetic substances as mercury and lead are contained in the water as the impurities, such impurities are prevented from flowing down the water passage 10 by the repulsive force of the permanent magnet 15 and stagnated on the upstream side of the rotor 13. To the water passing through the filter member 20, effective compositions contained therein are provided, consequently the quality of water obtained from the outlet 9 can be greatly improved.

Referring next to the operation of the second embodiment, when the water passes through the narrow gap 24 within the connecting pipe 22 the flow rate is increased and the outflow side of the narrow gap 24 is depressurized, air is drawn into the flow from the air suction pipe 25 by the ejector action. The air produces innumerable bubbles in the water, thereby oxygen is replenished into the water and the oxygen ion concentration of the water is raised higher by the magnetic field. Furthermore, the bubbles condense impurities contained in the water and adsorb onto the surfaces, which are removed while passing through the filter member 20. When such constant magnetic substances as iron and nickel are contained in the water as impurities, such impurities are sucked by the permanent magnet 15 in the rotor 13 or the small balls 27 of the filter member 20 comprising the permanent magnets. When such diamagnetic substances as mercury and lead are contained in the water as impurities, such impurities are prevented from flowing down the water passage 10 by the repulsive force of the permanent magnet 15 or the small balls 27, and stagnated within the hollow case 5.

Also, between a number of small balls 27 constituting the filter member 20, very fine gaps are formed to provide a complicated water passages. When the water passes through such passages, since the contact area between the water and the small balls 27 is large and both are contacting directly, a stronger magnetic field is applied to activate the water more, assuring the removal of impurities in the water. As a result, the quality of water obtained from the outlet 9 can be greatly improved.

Meanwhile, operations of the embodiments 3, 4 are similar to the above-noted embodiments, so their explanation will be omitted.

Referring now to the fifth embodiment, when water is filled into the container 38, it penetrates through the porous wall of the rotor 13, passing through the slits 45 of the cover plate 42 and slits of the cap 55 and accumulating in the inner and outer compartments of the rotor 13. In such a state, the rotor 13 adsorbs and filters offensive odors and the other impurities contained in the water by the adsorbing action of the porous wall and by the action of "bakuhanseki" stones, and at the same time, the permanent magnet 15 produces a magnetic field, in the surrounding water for activation, and raises the oxygen ion concentration in the water.

After opening the cover 37 prior to drinking and when the rotor 13 is rotated axially by operating the operating handle 39, the stirring means 40 begins to stir water and replenishes oxygen thereinto. Also, by the rotation of the permanent magnet 15, the magnetic field acting on the water is rotated to accelerate the activation of water increasing the oxygen ion concentration, thus healthful magnetization treated water can be obtained. When pouring the magnetization treated water, it can be effected by removing the cover 37 and opening the pouring mouth 36.

In the sixth embodiment shown in FIG. 13, when the lower projection 73 is engaged with the engaging groove 68 of the notch 68, the plate 75 is supported by the upper end surface of the cylinder portion 63, rotating the cover 37, the shaft 53 and the rotor 13 by operating the handle. Also, in the embodiment, by engaging the two projections 72, 73 with each engaging groove 66, 67, and rotating in one direction, the plug is retained tightly, and when they are removed upwardly through the notches 68, 69, the whole cover 37 including the shaft 53 may be removed.

The present invention is, as mentioned heretofore, designed to arrange the rotor 13 having the magnetic field generator 12 in a passage or a reservoir of fluid, and to rotate the same by rotating the rotating means to produce a d.c. rotating magnetic field in the surroundings, so that activation of the fluid is effected effectively resulting in a very efficacious improvement of the fluid quality.

What is claimed is:

1. Apparatus for magnetization treatment of a fluid comprising a fluid passage means, a magnetic field generator means rotatably disposed in said fluid passage means, and air introduction means in said passage means operable to draw in ambient air into said passage means to thereby introduce air into the fluid as the latter passes through said passage means and the fluid is subjected to the magnetic field generated by said magnetic field generator means, said air introduction means comprising a first and a second contiguous fluid passage section such that the fluid passes from said first fluid passage section to said second fluid passage section, said first fluid passage section having a cross-sectional area less than the cross-sectional area of said second fluid passage section such that the fluid moves faster through said first fluid passage section than said second fluid passage section, said air introduction means further comprising an air conduit in said second passage section opening up into said second fluid passage section such that air is drawn into said second fluid passage section through said air conduit, said fluid passage means comprising an inlet conduit connected to a housing, said generator means being disposed in said housing, said air introduction means being disposed in said inlet conduit.

2. Apparatus for magnetization treatment of a fluid comprising a fluid passage means, a magnetic field generator means rotatably disposed in said fluid passage means, said generator means having a generally spherical configuration, and rotatable means connected to said generator means for rotating said generator means.

3. Apparatus according to claim 2, wherein said generator means has a generally spherical outer surface, said rotatable means comprising vanes on said outer surface such that the fluid passing through said fluid passage means impinges on said vanes to rotate said generator means.

4. Apparatus according to claim 2, wherein said spherical generator means has two diametrically opposed shaft portions, said fluid passage means having bearing support means rotatably supporting said shaft portions such that said spherical generator means rotates about the axis of said shaft portions.

5. Apparatus according to claim 2, wherein said fluid passage means comprises a generally L-shaped housing having an upstream leg disposed at right angles to a downstream leg, said upstream and downstream legs having a partial spherical connection portion connecting said upstream and downstream legs, said spherical generator means having a center which is coincident with the center of said partial spherical connection portion.

6. Apparatus according to claim 2, wherein said rotatable means comprises vanes spaced from said generator means, and connecting means connecting said vanes to said generator means such that the fluid passing through said fluid passage means rotates said vanes and said rotating vanes rotate said generator means through said connecting means.

7. Apparatus according to claim 2, wherein said generator means comprises a spherical support means and permanent magnets mounted within a hollow portion in said support means.

8. Apparatus according to claim 7 further comprising additional permanent magnets mounted inside said fluid passage means.

9. Apparatus according to claim 2 further comprising filter means in said fluid passage means for filtering said fluid.

10. Apparatus according to claim 9, wherein said filter means comprises a plurality of ball elements.

11. Apparatus according to claim 10, wherein said ball elements are permanent magnets.

12. Apparatus for magnetization treatment of a fluid comprising a container having a top opening for admitting fluid and for removing fluid from the container, a magnetic field generator means rotatably mounted in said container, a support means mounted on said opening, and rotary means mounted on said support means and connected to said generator means for rotating said generator means in said container, whereby fluid admitted to said container through said opening is subjected to the magnetic field of said magnetic field generator means as said magnetic field generator means is rotated in said container by said rotary means and said fluid is subsequently removed from said container through said opening.

13. Apparatus according to claim 12, wherein said support means has a groove means and said rotary means has projection means disposed in said groove means for rotatably supporting said rotary means.

14. Apparatus according to claim 12, wherein said rotary means comprises a shaft and a crank means connected to said shaft such that rotation of said crank means rotates said shaft, said generator means having a shaft-receiving aperture, said shaft being slidably received in said aperture such that rotation of said shaft by said crank means effects rotation of said generator means.

15. Apparatus according to claim 14, wherein said rotary means is removably mounted on said support means such that when said rotary means is removed from said support means, said shaft slides out of said aperture.

16. Apparatus according to claim 14, wherein said rotary means is removably mounted on said support means and comprises a closure member operable to close off said opening in said container.

17. Apparatus according to claim 12, wherein said support means comprises first and second axially spaced grooves, said rotary means having a closure member and a first and second set of axially spaced projections, said rotary means having a first axial position in which said first set of projections are rotatably supported in said first groove to provide rotatable support of said rotary means on said support means, said rotary means having a second axial position in which said first set of projections are disposed in said second groove and said second set of projections are disposed on said first groove, said closure member effecting a closure of said opening when said rotary means is in said second axial position.

18. Apparatus according to claim 17, wherein each of said first and second grooves are defined by spaced radial flanges, said flanges having cut-outs which are operable to slidably receive said first and second set of projections to permit said rotary means to slide axially to and from said first and second axial positions.

19. Apparatus according to claim 18 further comprising a plate disposed in said rotary means and a biasing means operable to biasingly urge said late means toward the flange which defines said first groove.

* * * * *